(12) United States Patent
Zhou et al.

(10) Patent No.: US 11,714,849 B2
(45) Date of Patent: Aug. 1, 2023

(54) IMAGE GENERATION SYSTEM AND METHOD

(71) Applicant: Alibaba Damo (Hangzhou) Technology Co., Ltd., Zhejiang (CN)

(72) Inventors: Huiling Zhou, Hangzhou (CN); Jinbao Xue, Hangzhou (CN); Zhikang Li, Hangzhou (CN); Jie Liu, Hangzhou (CN); Shuai Bai, Beijing (CN); Chang Zhou, Hangzhou (CN); Hongxia Yang, Hangzhou (CN); Jingren Zhou, West Lafayette, IN (US)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/894,090

(22) Filed: Aug. 23, 2022

(65) Prior Publication Data

US 2023/0068103 A1 Mar. 2, 2023

(30) Foreign Application Priority Data

Aug. 31, 2021 (CN) .......................... 202111015905.2

(51) Int. Cl.
*G06F 16/583* (2019.01)
*G06F 16/58* (2019.01)
*G06F 18/22* (2023.01)

(52) U.S. Cl.
CPC ........ *G06F 16/583* (2019.01); *G06F 16/5866* (2019.01); *G06F 18/22* (2023.01)

(58) Field of Classification Search
CPC .. G06F 16/583; G06F 16/5866; G06K 9/6215
See application file for complete search history.

(56) References Cited

U.S. PATENT DOCUMENTS

| 7,269,576 B2 | 9/2007 | Stefik et al. |
| 7,343,226 B2 | 3/2008 | Ehlers et al. |

(Continued)

FOREIGN PATENT DOCUMENTS

| CN | 101151843 A | 3/2008 |
| CN | 106202352 A | 12/2016 |

(Continued)

OTHER PUBLICATIONS

Tang, D. et al. "Document Modeling with Gated Recurrent Neural Network for Sentiment Classification" Proceedings of the 2015 Conference on Empirical Methods in Natural Language Processing, pp. 1422-1432, Lisbon, Portugal, Sep. 17-21, 2015. c2015 Association for Computational Linguistics.*

(Continued)

*Primary Examiner* — Mia M Thomas

(57) ABSTRACT

Embodiments of this application provide an image generation system and method. In an exemplary manufacturing industry scenario, a style requirement of a product category in a manufacturing industry is automatically captured according to user behavior data and product description information associated with the product category. Based on these data, a style description text may be generated and converted to product images by using a text prediction-based image generation model. The product images are further screened by using an image-text matching model, to obtain a product image with high quality. This process covers from style description text mining to text-to-image prediction to image quality evaluation. It provides an automation product image generation capability for the manufacturing industry, shorten a cycle of designing and producing the product image in the manufacturing industry, and improve production efficiency of the product image.

20 Claims, 4 Drawing Sheets

(56) References Cited

U.S. PATENT DOCUMENTS

| | | | |
|---|---|---|---|
| 7,904,514 B2 | 3/2011 | Lapstun et al. | |
| 7,957,991 B2 | 6/2011 | Mikurak | |
| 7,987,491 B2 | 7/2011 | Reisman | |
| 8,181,021 B2 | 5/2012 | Ginter et al. | |
| 8,229,861 B1 | 7/2012 | Trandal et al. | |
| 8,239,276 B2 | 8/2012 | Lin et al. | |
| 8,370,362 B2 | 2/2013 | Szabo | |
| 8,386,465 B2 | 2/2013 | Ansari et al. | |
| 8,484,142 B2 | 7/2013 | Pinckney et al. | |
| 8,577,734 B2 | 11/2013 | Treyz et al. | |
| 8,694,357 B2 | 4/2014 | Ting et al. | |
| 8,732,023 B2 | 5/2014 | Mikurak | |
| 8,762,415 B2 | 6/2014 | Catahan, Jr. et al. | |
| 8,903,452 B2 | 12/2014 | Raleigh | |
| 8,918,730 B2 | 12/2014 | von Kaenel et al. | |
| 9,355,361 B2 | 5/2016 | Pinckney et al. | |
| 9,578,088 B2 | 2/2017 | Nickolov et al. | |
| 9,720,934 B1* | 8/2017 | Dube | G06V 10/40 |
| 9,899,063 B2 | 2/2018 | Avedissian et al. | |
| 10,417,532 B2* | 9/2019 | Liang | G06F 18/2411 |
| 10,592,959 B2 | 3/2020 | Wilkinson et al. | |
| 2014/0313216 A1 | 10/2014 | Steingrimsson | |
| 2016/0140776 A1 | 5/2016 | Ricci | |
| 2016/0140834 A1 | 5/2016 | Tran | |
| 2017/0004567 A1 | 1/2017 | Dutt et al. | |
| 2017/0262920 A1 | 9/2017 | Hodge | |
| 2018/0005302 A1 | 1/2018 | Ouimet et al. | |
| 2018/0083901 A1* | 3/2018 | McGregor, Jr. | H04L 51/02 |
| 2018/0210896 A1* | 7/2018 | Guo | G06N 20/00 |
| 2018/0276528 A1* | 9/2018 | Lin | G06N 3/084 |
| 2019/0117090 A1* | 4/2019 | Ishii | A61B 5/4836 |
| 2019/0304157 A1* | 10/2019 | Amer | G06V 40/23 |
| 2019/0325088 A1* | 10/2019 | Dubey | G06F 16/3329 |
| 2020/0050736 A1* | 2/2020 | Shayani | G06F 30/17 |
| 2020/0327327 A1* | 10/2020 | Wu | G06V 30/19173 |
| 2020/0349688 A1* | 11/2020 | Fang | G06T 3/0012 |
| 2021/0012200 A1* | 1/2021 | Lyske | G10L 25/51 |
| 2021/0158815 A1* | 5/2021 | Lee | G06T 11/60 |
| 2021/0191971 A1 | 6/2021 | Ko et al. | |
| 2022/0004720 A1* | 1/2022 | Wu | G06F 40/20 |
| 2022/0148316 A1* | 5/2022 | Kan | G06V 10/82 |
| 2022/0383044 A1* | 12/2022 | Bellegarda | G06V 30/194 |

FOREIGN PATENT DOCUMENTS

| | | |
|---|---|---|
| CN | 110136226 A | 8/2019 |
| CN | 111737505 A | 10/2020 |
| CN | 112508612 A | 3/2021 |
| WO | 2006136055 A1 | 12/2006 |
| WO | 2020177214 A1 | 9/2020 |

OTHER PUBLICATIONS

Wenzel, M. "Generative Adversarial Networks and other Generative Models" Computer Vision and Pattern Recognition Chapter 5, Jul. 8, 2022, pp. 1-56.*

First Office Action for Chinese Application No. 202111015905.2 dated Oct. 19, 2021 with search report.

Esser et al., "Taming Transformers for High-Resolution Image Synthesis," arXiv:2021.09841v3, Jun. 23, 2021.

Supplemental Search for Chinese Application No. 202111015905.2 dated Oct. 26, 2021.

* cited by examiner

IMAGE GENERATION SYSTEM AND METHOD

CROSS-REFERENCE TO RELATED APPLICATIONS

This application claims priority to Chinese Patent Application No. 202111015905.2, filed with the China National Intellectual Property Administration on Aug. 31, 2021 and entitled "IMAGE GENERATION SYSTEM AND METHOD." The entire content of the referenced application is incorporated herein by reference.

TECHNICAL FIELD

This application relates to the field of intelligent manufacturing technologies, and in particular, to an image generation system and method.

BACKGROUND

For article design and manufacture industries such as clothing industry, it often takes half a year or even longer from style planning to final production and put the products on shelf. For a jacket targeting the winter season, a costume designer basically needs to start designing a style and performing repeated proofing and modification since early summer. Such a production design model has low efficiency and is unwieldy in the face of rapidly changing fashion trends in the clothing industry. Certainly, the above-described inefficient production design model is not limited to the clothing industry. A plurality of manufacturing industries including articles-of-daily-use and household appliances are all facing low production design efficiency and cannot meet a fast-paced product updating requirement.

SUMMARY

A plurality of aspects of this application provide an image generation system and method, for shortening a cycle of designing and producing a product image in a manufacturing industry and improving production efficiency of the product image.

An embodiment of this application provides an image generation system, including: a text mining component, configured to obtain product category description information associated with a product category and user behavior data related to the product category; and generate, using a natural language processing (NPL) algorithm, a description text for the product category according to the product category description information and the user behavior data. The system may further include an image generation component, configured to input the description text into a text-to-image neural network for generating a plurality of initial product images according to the description text; input the plurality of initial product images and the description text into an image-text matching neural network; perform, using the image-text matching neural network, feature encoding on the plurality of initial product images and the description text to respectively obtain a plurality of image features corresponding to the plurality of initial product images and text features corresponding to the description text mapped into a semantic space; for each of the plurality of initial product images, determine a matching degree based on one or more corresponding image features and the text features; and obtain at least one candidate product image from the plurality of initial product images, wherein the at least one candidate product image has a matching degree meeting a threshold requirement.

An embodiment of this application further provides an image generation method, including: obtaining product category description information associated with a product category and user behavior data related to the product category; and generating, using a natural language processing (NPL) algorithm, a description text for the product category according to the product category description information and the user behavior data; inputting the description text into a text-to-image neural network for generating a plurality of initial product images according to the description text; inputting the plurality of initial product images and the description text into an image-text matching neural network; performing, using the image-text matching neural network, feature encoding on the plurality of initial product images and the description text to respectively obtain a plurality of image features corresponding to the plurality of initial product images and text features corresponding to the description text mapped into a semantic space; for each of the plurality of initial product images, determining a matching degree based on one or more corresponding image features and the text features; and obtaining at least one candidate product image from the plurality of initial product images, wherein the at least one candidate product image has a matching degree meeting a threshold requirement.

In some embodiments, the method may further include: training a codebook comprising a mapping relationship between image features and encodings, wherein the encodings are quantization text representation of the image features; generating a text sequence corresponding to the description text; inputting the text sequence into the text-to-image neural network; generating a plurality of encodings according to the text sequence based on a pre-trained codebook; and respectively performing image reconstruction on the plurality of encodings, to obtain the plurality of initial product images.

In some embodiments, the generating a plurality of encodings according to the text sequence based on a pre-trained codebook may include: inputting the text sequence into an encoder of the text-to-image neural network, and encode the text sequence, to obtain a first image feature; and inputting the first image feature into a decoder of the text-to-image neural network, and respectively decoding the first image feature based on the codebook and by using a sparse attention mechanism in the decoder, to obtain the plurality of encodings.

In some embodiments, the obtaining at least one candidate product image may include: selecting, according to the matching degrees, at least one of the plurality of initial product images with a matching degree being greater than a threshold.

In some embodiments, the generating a description text for the product category may include: performing text mining on the user behavior data associated with the product category, to obtain a product property; performing text mining on description information of a new product that appears within a latest time period in the product category, to obtain a product property and a category description of the new product; obtaining category property data from a category-property-value knowledge system of a manufacturing industry according to the product property, the product category description information, and the category description of the new product, wherein the category property data comprises at least a commodity style attribute; and generating the description text according to the category property data.

In some embodiments, the product category is one of a clothing product, a printing product, products for daily use, a furniture product, an appliance product, or a transportation product.

In some embodiments, the method may further include: displaying the at least one candidate product image to an evaluation system; obtaining a target product image in response to selection of the evaluation system; and using the target product image to guide a subsequent manufacturing process.

In the embodiments of this application, in a manufacturing industry scenario, a style requirement of a specified product category is automatically captured according to user behavior data associated with the specified product category and product description information of the specified product category, to generate a style description text, and the style description text is converted to product images by using a text prediction-based first image generation model. The product images are further screened by using a second image-text matching model, to obtain a product image with high quality. In the entire process, a procedure from style description text mining to text-to-image prediction to image quality evaluation is built, to provide an automation product image generation capability for a manufacturing industry, shorten a cycle of designing and producing the product image in the manufacturing industry, and improve the production efficiency of the product image.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DETAILED DESCRIPTION

To clearly states the technical solutions and advantages of this application, the technical solutions of this application will be clearly and completely described below with reference to specific embodiments of this application and the accompanying drawings. Apparently, the described embodiments are only some embodiments rather than all the embodiments of this application. All other embodiments obtained by a person of ordinary skill in the art based on the embodiments of this application without creative efforts shall fall within the protection scope of this application.

To address the low efficiency problem of current production and design model in manufacturing industries, this application describes a procedure covering from style description text mining to text-to-image prediction to image quality evaluation. The procedure is designed to provide an automation product image generation capability for the manufacturing industry, shorten a cycle of designing and producing the product image in the manufacturing industry, and improve production efficiency of the product image. In some embodiments of the procedure, a style requirement of a specified product category according to user behavior data associated with the specified product category and product description information of the specified product category may be automatically captured to generate a style description text. The style description text may then be converted to product images by using a text prediction-based first image generation model. The product images are further screened by using a second image-text matching model to obtain a product image with high quality. The final product image may be used as a target product to be manufactured.

The following describes the technical solution provided in various embodiments of this application in detail with reference to the accompanying drawings.

Figure 1:
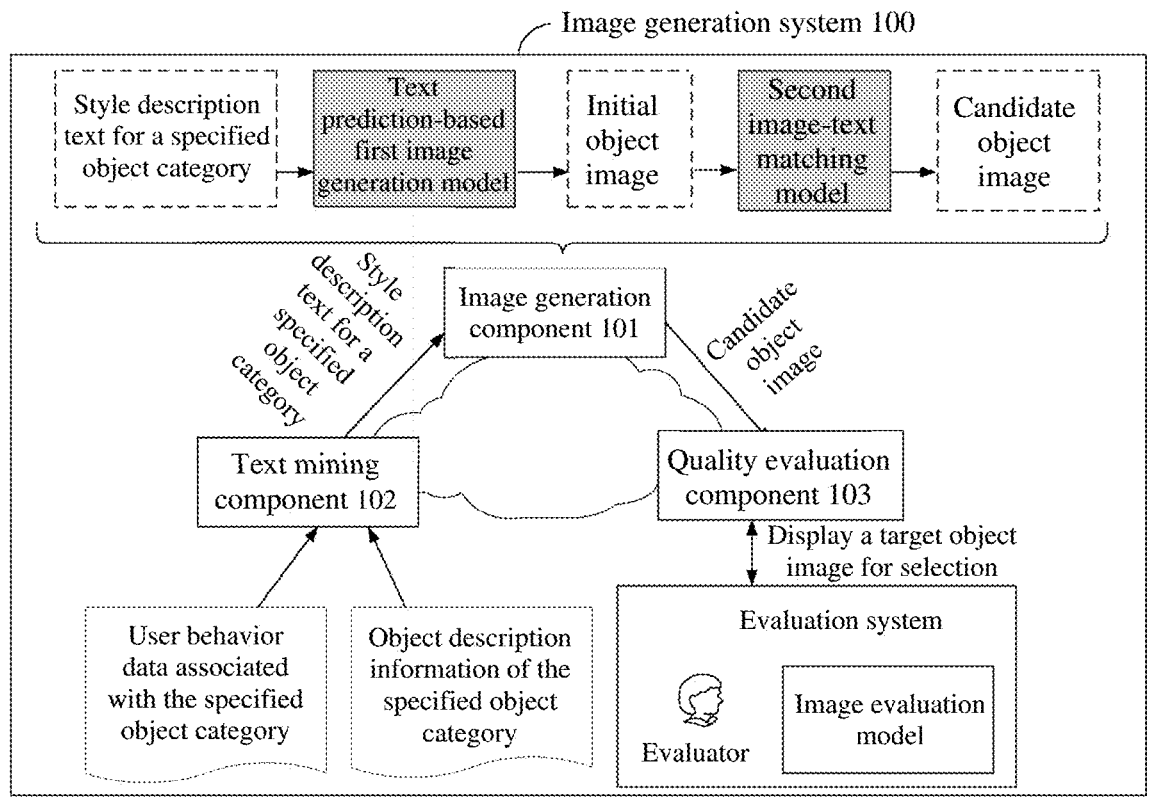
FIG. 1 is a schematic structural diagram of an image generation system, according to an exemplary embodiment of this application.

FIG. 1 is a schematic structural diagram of an image generation system, according to an exemplary embodiment of this application. As shown in FIG. 1, the system 100 includes: an image generation component 101 and a text mining component 102 connected to the image generation component 101 through a network. Further, optionally, as shown in FIG. 1, the image generation system 100 further includes: a quality evaluation component 103 connected to the image generation component 101 through the network.

In this application, deployment implementations of the image generation component 101, the text mining component 102, and the quality evaluation component 103 are not limited. In some embodiments, the components are deployed in a distributed manner, and an entire system function may be implemented by using a cloud computing system. For example, the image generation component 101, the text mining component 102, and the quality evaluation component 103 may be all deployed in a cloud such as a data center or a center cloud system. Alternatively, the image generation component 101 may be deployed in a cloud such as a data center or a center cloud system and implemented as a cloud server, to run various neural network model for generating a product image by taking advantages of cloud resources. Compared with being deployed in the cloud, the text mining component 102 may be deployed in various e-commerce platforms and a user end side, to acquire user behavior data and product description information. Correspondingly, the quality evaluation component 103 is deployed in a computing environment of a manufacturing industry. Regardless of positions of the deployment, the text mining component 102 may be deployed in a terminal device such as a desktop computer, a notebook computer, or a smartphone or may be deployed in a server device such as a conventional server, a cloud server, or a server array. The quality evaluation component 103 may be deployed in various devices such as a desktop computer, a notebook computer, or a smartphone provided with a display screen.

The image generation system provided in this embodiment of this application may be applied to various manufacturing industries. The manufacturing industry generally refers to an industry in which resources (for example, materials, energy, devices, tools, money, technologies, information, and manpower) are converted to large-scale tools, industrial goods, consumer products that can be used by people through manufacturing according to a market requirement in the era of machinery industry, for example, including, but not limited to, various manufacturing industries of food, clothing, cigarette, furniture, papermaking, printing, sports and entertainment goods, and medicine or chemical. For ease of description and distinguishing, in this embodiment of this application, a description is made by using an example in which the image generation system generates a product image required by a manufacturing industry. The manufacturing industry may be any industry that relies on a product image for production and manufacturing and may be, for example, but not limited to, a clothing industry, a printing industry, an articles-for-daily-use industry, a furniture industry, an appliance industry, or a passenger car industry. Especially, the manufacturing industry may be a manufacturing industry that supports customer-to-manufacturer (C2M). By using the image generation system provided in this embodiment of this application, a personalized customization requirement of a user may be satisfied, and a high-quality product image meeting the customization requirement of the user can be quickly and efficiently generated for the user.

For example, when being applied to a food manufacturing industry, the image generation system provided this embodiment of this application may quickly and efficiently generate a food sample image for the food manufacturing industry. The food sample image includes a sample design of a food product, for example, bear-shaped biscuits or pig-shaped pastries. In another example, when being applied to a clothing manufacturing industry, the image generation system provided in this embodiment of this application may quickly and efficiently generate a clothing sample image for the clothing manufacturing industry. The clothing sample image includes a sample design of a clothing product, for example, a sweater with a drawstring and a hat or a cropped blouse with puff sleeves.

Regardless of what kind of manufacturing industry the manufacturing industry is, various products are usually produced in the manufacturing industry. For the purpose of product management, these products may be classified based on categories, and there are obvious differences between products under different product categories, which are mainly reflected in some properties of the products. The products produced in the manufacturing industry may be finished or semi-finished products in the manufacturing industry. The finished products may also be referred to as commodities when being put into use, for example, clothing, vehicles, or household appliances. In this embodiment of this application, no attention is paid to category classification on the products nor dimensions on which the classification is based are not limited. In this embodiment, the image generation system may generate product images required by various product categories at a granularity of the product categories in the manufacturing industry, which is conductive to reducing processing burdens of the image generation system, and it may be ensured that the product images with high accuracy are generated.

In the image generation system of this embodiment, on one hand, the text mining component 102 is configured to determine a specified product category of which a product image needs to be generated in the manufacturing industry, and on the other hand, is responsible for generating a style description text for the specified product category. The product image is an image including a product style. Subsequent modeling, plate-making, or another production process may be performed based on the product image. In this embodiment, an implementation in which the text mining component 102 determines the specified product category of which the product image needs to be generated in the manufacturing industry is not limited.

In some embodiments, the text mining component 102 may perform image requirement analysis on various product categories in the manufacturing industry and recognize, according to an analysis result, the product categories for which new product images need to be generated. The product categories of which the new product images need to be generated are used as the specified product categories in this embodiment of this application. For example, the text mining component 102 may track a time when a product image in each product category is updated for the last time in the manufacturing industry and/or a product fashion trend in each product category. When a time interval between the time when the product image is updated for the last time and current time is greater than a set interval threshold and/or when a currently used product image does not conform to a current product fashion trend, it indicates that the product image needs to be updated for the product category, and the product category is used as the specified product category.

In some embodiments, the text mining component 102 may receive a product image generation instruction from a management end of the manufacturing industry and parse out, from the product image generation instruction, a product category of which a product image needs to be generated as the specified product category in this embodiment of this application. In the optional embodiment, that new product images need to be generated for which product categories is determined by the management end or management personnel of the manufacturing industry according to a manufacturing requirement. For example, for a hot or popular product category, to ensure that a new product (for example, a commodity) in the product category conforms to a current trend requirement, the management end may send a product image generation instruction to the image generation system provided in this embodiment of this application, to request generating a product image conforming to the current trend for the product category. In another example, for a product category that is unfashionable and has serious loss of customers, to help the product category recall the customers, the management end may send a product image generation instruction to the image generation system provided in this embodiment of this application, to request generating a product image in which a user is interested or conforms to a user requirement for the product category.

In a case that the specified product category of which the product image needs to be generated is determined, the text mining component 102 may generate a style description text for the specified product category through a text mining capability using natural language processing (NPL) algorithms. The style description text is text information that may reflect a style requirement of the specified product category. Optionally, if the style description text reflects a fashion trend of the specified product category, the style description text may be referred to as a trend text. The style description text may describe a style requirement of the specified product category by using a text and a digit. For example, the clothing manufacturing industry is used as an example, in a scenario, a style description text corresponding to a category of women's chiffon shirts may include, but not limited to, words such as "puff sleeves," "flounce," "doll collar," and "lace," and style requirements of the women's chiffon shirts are described by using the words. In another scenario, a style description text corresponding to a category of women's messenger bags may include, but not limited to, words such as "tassels," "sequins," "squares," or "chains," and style requirements of the women's messenger bags are described by using the words.

In this embodiment, the text mining component 102 may obtain user behavior data associated with the specified product category and may further obtain product description information of the specified product category. Further, the text mining component generates the style description text for the specified product category according to the user behavior data associated with the specified product category and the product description information of the specified product category. The user behavior data is behavior data generated by users on various network platforms (mainly e-commerce platforms) for various products in the specified product category and includes, but not limited to, behavior data such as browsing, adding to a shopping cart, adding to favorites, placing orders, or commenting on various products (such as products or commodities) on the e-commerce platforms, and also includes behavior data such as recommendations and Q&A for various products on some social platforms. Specifically, the text mining component 102 may obtain the user behavior data associated with the specified product category from various network platforms (mainly the e-commerce platforms) through a web crawler to crawl the user comments or blogs commenting related to the product category; or through APIs provided by the network platforms for fetching user behavior data (adding to favorites, adding to shopping carts, placing orders, etc.) related to products in the product category. The user behavior data may reflect a product property and a category description in which the user is interested to a certain extent.

In some embodiments, a part of products belonging to the specified product category may be selected. The selected part of the products is referred to as a selected product, and the product description information of the specified product category is represented by description information of the selected product. In this embodiment, an implementation in which the text mining component 102 selects the selected product from the products belonging to the specified product category is not limited. For example, a product of which a price falls within a specified price range may be selected according to the price of the product, or a product generated by a specific manufacturer may be selected according to the manufacturer, or a product conforming to a fashion trend may be selected according to the current fashion trend. For example, a new product that appears within a latest time period in the specified product category is used as the selected product, and the new product may reflect a current fashion trend of the specified product category to a certain extent. In this embodiment, the description information of the selected product may include, but not limited to, various basic property information such as a brand, a size, a color, or a style of the product and may further include property information such as a quantity of new selected products and sales data that can reflect popularity of the selected product.

In the optional embodiment, in a case that the new product that appears within the latest time period in the specified product category is used as the selected product, when generating the style description text for the specified product category according to the user behavior data associated with the specified product category and the product description information of the specified product category, the text mining component 102 may perform text mining on the user behavior data associated with the specified product category, to obtain a product property and a category description in which the user is interested; and perform text mining on the description information of the new product that appears within the latest time period in the specified product category, to obtain a product property and a category description of the new product. The selected product may reflect a fashion trend of the specified product category to a certain extent. The text mining may be performed on the user behavior data or the description information of the selected product by using NPL algorithm based on term frequency-inverse document frequency (TF-IDF). A process of performing text mining on the user behavior data by using the TF-IDF-based NPL algorithm includes: performing word segmentation on the acquired user behavior data using dynamic programming, to obtain a segmented word set; counting, for each segmented word in the segmented word set, a term frequency TF of the segmented word occurring in the user behavior data, counting an inverse document frequency IDF of the segmented word occurring in a corpus (collected offline), and performing weighted summation on the TF and the IDF, to obtain a degree of distinction of the segmented word; and using, if the degree of distinction of the segmented word is greater than a set degree of distinction threshold, a product property or a category description represented by the segmented word as the product property or the category description in which the user is interested. A process of performing text mining on the description information of the selected product by using the TF-IDF algorithm is similar. Details are not described herein again.

Further, after the product property and the category description in which the user is interested and the product property and the category description of the new product are obtained, category property data may be obtained from a category-property-value (CPV) knowledge system of the manufacturing industry according to the product property and the category description in which the user is interested and the product property and the category description of the new commodity. The style description text is generated according to the category property data. The CPV knowledge system is pre-built. The knowledge system may include, but not limited to, product property data such as category information to which a product belongs, property information of the product in a plurality of dimensions, and a property value. In this embodiment, the category property data in which the user is interested and is popular may be obtained from the CPV knowledge system according to the product property and the category description in which the user is interested and the product property and the category description of the new commodity. The category property data includes at least a commodity style property, and a product corresponding to the category property data is popular.

In this embodiment, after generating the style description text for the specified product category, the text mining component 102 may be configured to provide the style description text for the specified product category to the image generation component 101. The image generation component 101 is configured to input the style description text into a text prediction-based first image generation model for image generation, to obtain a plurality of initial product images. The text prediction-based first image generation model is a multimodality neural network model that may generate a product image corresponding to the style description text according to the style description text. In this embodiment, a model structure of the text prediction-based first image generation model is not limited, and any neural network model that can generate the product image based on text prediction is applicable to this embodiment of this application. In this embodiment, the first image generation model converts from a "text" modality to an "image" modality. For instance, a super mega pre-trained (multi-modality to multi-modality multitask mega-transformer, M6) model may be used as the text prediction-based first image generation model used in this embodiment, but is not limited thereto. The M6 model is a super mega multi-modality language pre-trained model and is a large artificial intelligence model with universality, has trillions or even billions model parameters and may generate a high-definition image with a resolution of 1024*1024 or higher in terms of text-to-image.

In this embodiment of this application, considering that there may be some unreasonable situations in the plurality of initial product images generated by the text prediction-based first image generation model, for example, the initial product images do not meet a description of the style description text, or there are vestiges, shadows, blurs, or the like in the initial product images. To obtain a product image with high quality, in this embodiment of this application, after the plurality of initial product images are generated, the image generation component 101 may input the plurality of initial product images and the style description text into a second image-text matching model for matching, to obtain at least one candidate product image of which an image-text matching degree meets a threshold requirement. The second image-text matching model is mainly configured to determine an image-text correlation, that is, determine whether the initial product images meet a description of the style description text. In this embodiment of this application, a model structure of the second image-text matching model is not limited, and any neural network model that can perform image-text correlation matching is applicable to this embodiment of this application. For example, the second image-text matching model may be, but not limited to, a contrastive language-image pre-training (CLIP) model, or the like.

Further, optionally, as shown in FIG. 1, the image generation system 100 provided in this embodiment further includes: the quality evaluation component 103. The quality evaluation component 103 is connected to the image generation component 101 through the network and is configured to receive the at least one candidate product image sent by the image generation component 101 and display the at least one candidate product image to an evaluation system for the evaluation system to select a target product image meeting a production and design requirement from the at least one candidate product image; and obtain the selected target product image in response to selection of the evaluation system, and use the target product image for a subsequent manufacturing link.

In some embodiments, the evaluation system may be formed by evaluators. After the quality evaluation component 103 displays at least one candidate product image to a screen of the evaluation system, an evaluator may determine, with experience, whether the candidate product image meets the production and design requirement and select a target product image meeting the production and design requirement from the at least one candidate product image based on a result of the determining. There may be one or more target product images such as two, three, or five target product images. Optionally, the evaluator may be a designer in the manufacturing industry or a design reviewer, but is not limited thereto. For example, in the clothing manufacturing industry, a costume designer may select a target product image meeting a trend and a design philosophy from the perspective of design according to experience. Then, the target product image may enter plate-making and modeling links until entering a clothing production line to complete clothing production. Further, optionally, the evaluator may further score quality of the candidate product image by using the quality evaluation component 103. The quality evaluation component 103 may further obtain a scoring result from the designer and sort or screen the candidate product image according to the scoring result. Optionally, the evaluator may intuitively determine whether the candidate product image matches a style requirement of a current specified product category and score quality of the candidate product image according to a matching degree. Alternatively, when outputting the candidate product image, the quality evaluation component 103 may further output a style description text corresponding to the candidate product image. The evaluator may determine a matching degree between the candidate product image and the style description text with experience, and score quality of the candidate product image according to the matching degree between the candidate product image and the style description text.

In another optional embodiment, the evaluation system in this embodiment may alternatively be formed by an image evaluation model. Before that, images of popular products in a specified product category may be used as a sample set in advance, and model training is performed by using the sample set, to obtain a product image more conforming to the fashion trend in the sample set. Optionally, the image evaluation model may be a classifier model, for example, may include a convolution layer, a pooling layer, and a multilayer perceptron. The convolution layer is configured to perform convolution processing on an inputted sample image, to obtain first feature information. The pooling layer is configured to downsample the first feature information, to obtain second feature information, so as to reduce a data volume. The second feature information is inputted into the multilayer perceptron. In the multilayer perceptron, the second feature information is converted by using an activation function, a classification result of the sample image is obtained according to a result of the conversion, that is, the sample image is the product image more conforming to the fashion trend in the sample set or is not the product image more conforming to the fashion trend in the sample set. After the image evaluation model is trained, the at least one candidate product image may be inputted into the image evaluation model. The image evaluation model classifies the at least one candidate product image, to obtain a candidate product image more conforming to the fashion trend as the target product image.

In the embodiments of this application, in a manufacturing industry scenario, a style requirement of a specified product category is automatically captured according to user behavior data associated with the specified product category and product description information of the specified product category, to generate a style description text, and the style description text is converted to product images by using a text prediction-based first image generation model. The product images are further screened by using a second image-text matching model, to obtain a product image with high quality. In the entire process, a procedure from style description text mining to text-to-image prediction to image quality evaluation is built, to provide an automation product image generation capability for the manufacturing industry, shorten a cycle of designing and producing the product image in the manufacturing industry, and improve production efficiency of the product image.

In some embodiments of this application, the image generation component 101 generates the plurality of initial product images according to the style description text based on the first image generation model in a two-stage image generation manner. The first stage A1 is a stage of pre-training the first image generation model and a codebook used by the first image generation model. For a process of training the first image generation model and the codebook, reference may be made to subsequent embodiments. Details are not described herein again. A second stage A2 is a stage in which the image generation component 101 uses the first image generation model and the codebook. The image generation stage further includes two stages of from the style description text to an image sequence and then reconstructing the initial product image from the image sequence, rather than directly from the style description text to the initial product image. Specifically, a text sequence corresponding to the style description text is inputted into the text prediction-based first image generation model, and a plurality of image sequences are generated according to the text sequence based on a pre-trained codebook. Image reconstruction is respectively performed on the plurality of image sequences, to obtain the plurality of initial product images. The codebook is a dictionary that may be trained based on a plurality of training images to reflect a mapping relationship between the image sequences and image pixels, so that the codebook can represent an image by using the image sequences and is a quantization text representation of the image sequences. Specifically, the codebook includes a plurality of codes, and an index number corresponds to each code. The codes are results of performing quantization processing on image features and may reflect the image features. One image may be mapped to a combination of a series of codes after feature extraction and quantization processing, and index numbers corresponding to the codes may form image sequences corresponding to the image. During quantization on the image, block processing may be performed on the image. For example, block processing is performed on an image with a size of 256*256, to obtain 16 local images with a size of 16*16. If a code is extracted from each of the 16 local images, the image with the size of 256*256 may be mapped to image sequences corresponding to (256/16)*(256/16)=16*16=256 codes. The image sequences include index numbers corresponding to the 256 codes.

Figure 2A:
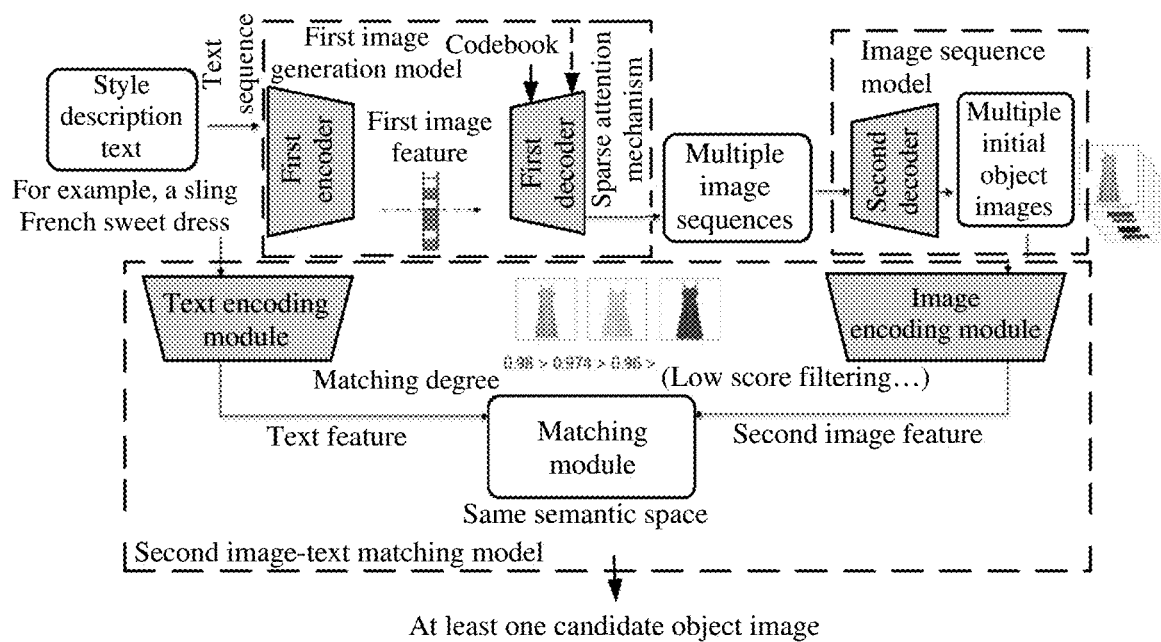
FIG. 2a is an internal architectural diagram of an image generation system, according to an exemplary embodiment of this application.

In some embodiments, the first image generation model of this embodiment adopts an encoder-decoder structure of a deep self-attention transformer network (transformer). Implementation structures of the encoder and the decoder are not limited. For example, in an implementation structure of the first image generation model shown in FIG. 2c, the encoder may include a plurality of layers, which are respectively a multi-head attention layer, an Add&Norm layer, a feed-forward layer, and another Add&Norm layer. The Add represents a residual connection and is used for preventing network degradation. The Norm represents layer normalization and is used for performing normalization on an activation value of each layer. The multi-head attention layer includes a plurality of self-attention mechanism layers. Similarly, the decoder may also include a plurality of layers, which are respectively a multi-head self-attention layer, a multi-head cross-attention layer, a feed-forward layer, and an Add&Norm layer located above each layer. A masked operation is used in the multi-head self-attention layer. Only an example of the first image generation model is shown in FIG. 2c and is not limited thereto.

Further, in the first image generation model of this embodiment, cross-modality information is exchanged on an encoder side, and a multi-modality representation is understood, that is, a text feature is converted into an image feature. In addition, the decoder is responsible for learning natural language generation and is configured to convert the image feature to an image sequence. Specifically, during training, the encoder receives a residual network (ResNet) feature sequence from an image side and encoding from a text side and combines common positional encoding and segment encoding. Further, the encoder bidirectionally establishes an association between the information by using an attention mechanism and learns a context-based deep representation. For the decoder, a high-level representation from the encoder is associated by using the attention mechanism, and natural language generation in an autoregressive form is learned by using a unidirectional self-attention.

For ease of distinguishing and description, the encoder in the first image generation model is referred to as a first encoder and the decoder in the first image generation model is referred to as a first decoder. The first encoder is mainly configured to encode the text sequence to obtain an image feature, and the first decoder is mainly configured to decode the image feature to obtain image sequences. Based on the foregoing, the image generation component 101 inputs the text sequence into the first encoder, and encodes the text sequence, to obtain a first image feature; and inputs the first image feature into the first decoder, and respectively decodes the first image feature based on the codebook, to obtain the plurality of image sequences, as shown in FIG. 2a.

In some embodiments, the text prediction-based first image generation model may output an image sequence with a length of 256. Image reconstruction may be performed on the image sequence with the length of 256, to obtain a product image with a resolution of 256*256. In addition, if it is required that the resolution of the product image is 800*800 in an actual application, the initial product image obtained by performing image reconstruction on the image sequence with the length of 256 cannot meet an actual display requirement. Based on the foregoing, in this embodiment, the lengths of the image sequences generated by the first image generation model are extended, that is, the image generation model can generate image sequences with larger lengths. Then, image reconstruction is performed on the image sequences with the larger lengths, to obtain a plurality of initial product images meeting the display requirement. Optionally, a length of an image sequence outputted by the image generation model may be greater than or equal to 4096. Image reconstruction may be performed on the image sequence with a length greater than or equal to 4096 to obtain a high-definition image with a resolution of 800*800 or 1024*1024.

Further, because the length of the image sequence to be generated increases, if the conventional transformer processing manner is used, when a current code in the image sequence is calculated, correlation calculation needs to be performed with all codes before the current code, which will increase an amount of calculation of the image generation model and affect the efficiency and quality of the image sequence generated by the first image generation model. Based on the foregoing, when respectively decoding the first image feature based on the codebook to obtain the plurality of image sequences, the image generation component 101 may decode the first image feature based on the codebook and by using a sparse attention mechanism in the first decoder to obtain the plurality of image sequences. The basic idea of the sparse attention mechanism is to reduce the calculation of correlation, that is, when the current code in the image sequence is calculated, correlation calculation is performed on a part of codes before the current code rather than all codes before the current code. For example, when a jth code in a first image sequence is calculated, correlation calculation is performed with k codes before the jth code. j and k are positive integers, there are a total of m codes before the jth code, and m is a positive integer and m is greater than k.

In some embodiments, at the first stage, the codebook is trained based on the training of an image sequence model. The image sequence model may implement image sequence, that is, a process of generating an image sequence based on an image; and may further implement image reconstruction, that is, a process of performing image reconstruction based on the image sequence to obtain the image. A structure of the image sequence model is not limited, and any model that may implement an image sequence and perform image reconstruction based on the image sequence is applicable to this embodiment of this application. In this embodiment, a description is made by using an example in which the image sequence model adopts an encoder-decoder structure of a transformer structure, but is not limited thereto. The encoder may include a plurality of layers such as a residual connection layer, a downsampling layer, or a feed-forward layer. Similarly, the decoder may also include a plurality of layers such as a residual connection layer, an upsampling layer, an excitation layer (for example, a softmax layer), or a feed-forward layer. For ease of distinguishing and description, the encoder in the image sequence model is referred to as a second encoder and the decoder in the image sequence model is referred to as a second decoder. The second encoder is configured to obtain an image sequence, and the second decoder is configured to perform image reconstruction based on the image sequence. Based on the foregoing, when respectively performing image reconstruction on the plurality of image sequences, to obtain the plurality of initial product images, the image generation component 101 may input the plurality of image sequences into the image sequence model, and the second decoder respectively performs image reconstruction on the plurality of image sequences, to obtain the plurality of initial product images, as shown in FIG. 2a. In this implementation, encoders and decoders in two neural network models (that is, the image generation model and the image sequence model) work together to implement a generation process from the style description text to the initial product image. Specifically, a text sequence corresponding to the style description text is inputted into the first encoder of the first image generation model, and the first encoder encodes the text sequence to obtain a first image feature. The first image feature is inputted into the first decoder of the first image generation model, and the first decoder respectively decodes the first image feature based on a pre-trained codebook, to obtain a plurality of image sequences. Further, the plurality of image sequences are inputted into the second decoder of the image sequence model, and the second decoder respectively performs image reconstruction on the plurality of image sequences, to obtain the plurality of initial product images. In this implementation, the neural network models are crossed, and information modality during processing is from the text sequence to the image sequence to the image, rather than directly from the text sequence to the image, which helps to improve the accuracy of the generated image and also simplifies the complexity of a single neural network model.

In the foregoing or following embodiments of this application, the first stage A1 includes a process of training the codebook, that is, a process of synchronously training the image sequence model. The image sequence model may be considered as a neural network model obtained by training the codebook. Because the codebook requires versatility or universality, a plurality of cross-field original sample images may be acquired when the codebook and the image sequence model are trained. Model training is performed by using the cross-field original sample images, to obtain the image sequence model and the codebook. Correspondingly, the first stage A1 further includes a process of training the first image generation model. Compared with the codebook, the first image generation model needs to be able to generate a product image in a targeted manner. Therefore, when the first image generation model is trained, an image-text sample in the specified product category in the manufacturing industry may be used as a training sample for training the image generation model. To improve the accuracy of the first image generation model, a large quantity of training samples may be used, for example, 10 million samples may be used, but are not limited thereto.

When the image sequence model and the codebook are trained, model training may be performed by using a vector quantization generative adversarial network (VQGAN) and using a plurality of original sample images in a vector quantization manner, to obtain a quantized codebook and image sequence model. From the perspective of a model architecture, the VQGAN adopts a model architecture of encoder-quantizer-decoder and aims at training a codebook. One two-dimensional image may be compressed into a one-dimensional image sequence through the codebook and the encoder and the quantizer of the image sequence model, and at the same time, the image sequence may be further restored to the original two-dimensional image as much as possible by using the decoder of the image sequence model. For example, an original RGB image I with a resolution of H*W (H is the height of the image and W is the width of the image) first passes through the encoder to obtain an image feature (H/N)*(W/N)*C of n downsampling, where C is a feature dimension. Subsequently, the image feature is changed into a quantized sequence with a length of (H/N)*(W/N) by using the quantizer. Finally, the quantized sequence is restored into an image J of H*W by using the decoder. The encoder is a convolutional neural network and is formed by a residual network and a downsampling module. The structure of the decoder is similar to the structure of the encoder, except that the corresponding downsampling module is replaced with an upsampling module. The quantizer module is an encoding dictionary, that is, a codebook. An inputted feature is replaced with the closest code in the codebook. To improve the accuracy of the model, three types of loss functions are used when model training is performed by using the VQGAN. The first one is a per-pixel minimum mean-square error function used for constraining the local consistency of an image. The second one is a perceptual loss function used for constraining semantic consistency of the image by using an intermediate layer feature of a visual geometry group (VGG) network. The third one is an adversarial loss function for further improving the definition of the generated image by using a patch-based convolutional neural network (PatchCNN) of an additional image block discriminative network.

From the perspective of a model training principle, the VQGAN includes a generative model and a discriminative model. During model training, the generative model mainly learns a real image distribution, that is, an original sample image distribution, to make an image generated by the generative model more real, so that the discriminative model cannot distinguish whether data is real data. The discriminative model is configured to determine whether a received image is an image of a real world, that is, a probability that outputted data is a real image rather than a generated image. The discriminative model may feedback a loss of model training to the generative model, and a capability of generating an approximately real image of the generative model is improved by using the loss. The entire process may be considered as a game between the generative model and the discriminative model, and finally the two network models reach a dynamic balance after continuous alternate iterations, that is, the discriminative model cannot determine whether data sent by the generative model is a real image, and a discrimination probability is about 0.5, which is approximate to random guessing.

In some embodiments, the process of training the image sequence model may be completed at one stage. In this process, adversarial training is directly performed by the generative model and the discriminative module of the image sequence model, to obtain the image sequence model and the codebook. In this embodiment, the adversarial training and the non-adversarial training are relative concepts. The adversarial training refers to a training process in which the generative model and the discriminative model balance each other. Specifically, the generative model generates an observation sample image similar to the original sample image as much as possible to cheat the discriminative model, and the discriminative model distinguishes the observation sample image generated from the generative model from the original sample image as much as possible. Correspondingly, the non-adversarial training refers to a training process that does not use adversarial training to balance each other, but performs a regular operation such as convolution, pooling, or sampling on an initial model based on the plurality of original sample images.

In another optional embodiment, compared with a conventional vector quantized variational autoencoder (VQ-VAE) quantization technology, in this embodiment, the VQGAN technology is used, and model training is performed by using the plurality of original sample images, to obtain the image sequence model and the codebook, and a clearer reconstructed image such as an initial product image is may be obtained in a patch-based generative adversarial network optimization manner. However, the reconstructed image is distorted in a detailed part (which is mainly because discriminators are generated iteratively during training of the image sequence model). Considering that iteration during generation of the codebook is difficult, and the task of generating the observation sample image by the generative model is more difficult than the discriminative task of the discriminative model. Based on this, the processing of training the image sequence model may be completed at two stages, to obtain the image sequence model and the codebook. A first stage is a non-adversarial training stage in which the discriminative model is not started (that is, the generative model is first used for a plurality of iterations), and a second stage is an adversarial training stage in which the discriminative model is started (after the plurality of iterations are completed, the discriminative model is started for adversarial training). The plurality of iterations may be a set quantity of rounds of iterations such as 3000 rounds or 10000 rounds. After the quantity of rounds of the iterations are completed, the discriminative model is started for adversarial training. Alternatively, a quantity of iterations may be determined according to a loss function of the generative model. For example, when a value of the loss function is less than a set threshold, the discriminative model is started for adversarial training.

Specifically, the plurality of original sample images are divided into a first sample group and a second sample group. The first sample group is used for the non-adversarial training stage in which the discriminative model is not started, and the second sample group is used for the adversarial training stage in which the discriminative model is started. Optionally, a quantity of samples in the first sample group may be less than a quantity of samples in the second sample group. For example, in a case that there are 3 million original sample images, the quantity of samples in the first sample group may be 1 million, and the quantity of samples in the second sample group may be 2 million, but a specific quantity listed herein is not limited thereto. The image sequence model is trained at two stages below. The two stages of the process of training the image sequence model are independent of each other.

Figure 2B:
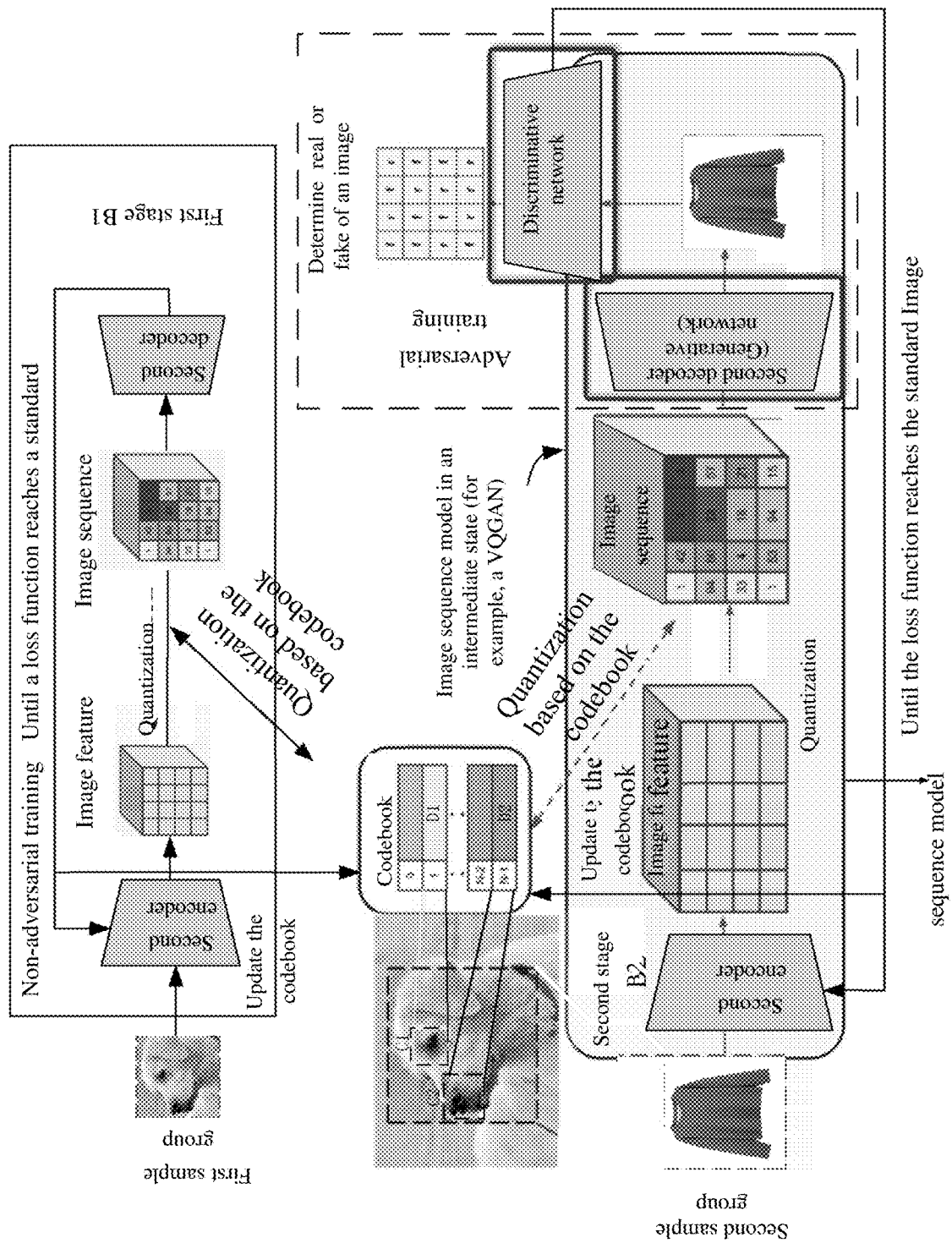
FIG. 2b is a diagram of a process of generating an image sequence model and a codebook, according to an exemplary embodiment of this application.
Figure 2C:
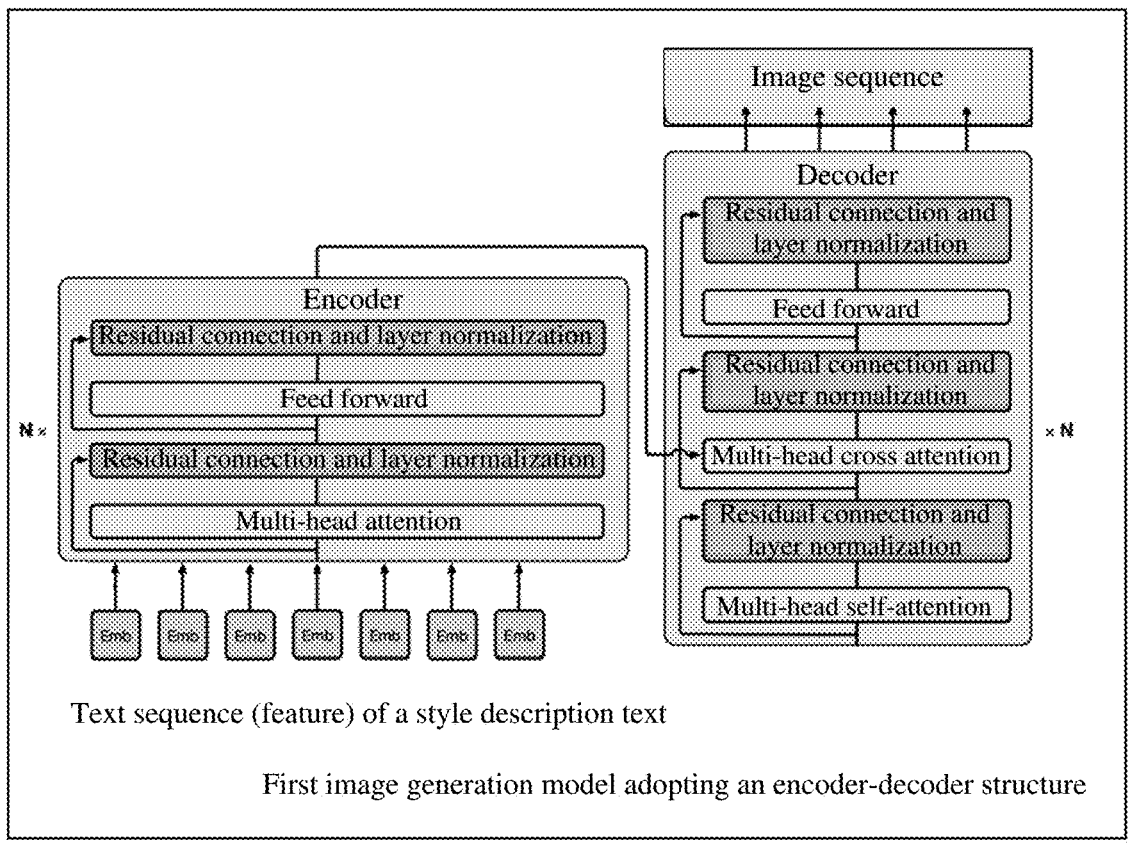
FIG. 2c is an exemplary structure of an image generation model, according to an exemplary embodiment of this application.

At a first stage B1, non-adversarial training is performed on an initial model by using the original sample images in the first sample group, to obtain an image sequence model in an intermediate state, as shown in FIG. 2b. The initial model is an initial image sequence model. The model includes an initial second encoder and an initial second decoder. The initial second encoder is configured to perform feature extraction on the original sample images in the first sample group, to obtain an image feature, and perform quantization on the image feature by using an initial codebook to obtain image sequences. The image sequences include index numbers of corresponding codes after the image feature is quantized. The image sequences are decoded by using the initial second decoder to obtain a restored image. Further, a loss function of the first stage B1 is calculated according to a difference between the restored image and the original sample image such as a residual between two images. If the loss function does not meet a requirement, iteration is continuously performed until the loss function meets the set requirement, to obtain an image sequence model with high quality, that is, an image sequence model in an intermediate state and a codebook in an intermediate state. The image sequence model in the intermediate state includes a second encoder in the intermediate state and a second decoder in the intermediate state. After the image sequence model in the intermediate state is obtained, a model training process of a second stage B2 is entered. The training process of the first stage B1 is a process of performing non-adversarial training by using only the generative model (that is, the second decoder) without starting the discriminative model.

At the second stage B2: adversarial training is performed on the image sequence model in the intermediate state by using the vector quantization generative adversarial network and using the original sample images in the second sample group, to obtain the image sequence model and the codebook, as shown in FIG. 2b. As shown in FIG. 2b, at the second stage B2, the second decoder in the intermediate state may be used as the generative model in the VQGAN, and adversarial training is performed in combination with the discriminative model in the VQGAN, to finally obtain the image sequence model and the codebook. At the second stage B2, the second encoder in the intermediate state is configured to perform feature extraction on the original sample images in the second sample group to obtain an image feature, and perform quantization on the image feature by using the codebook in the intermediate state to obtain image sequences. The image sequences include index numbers of corresponding codes after the image feature is quantized. The image sequences are decoded by using the second decoder in the intermediate state to obtain a restored image. Further, the restored image is sent to the discriminative model for real or fake determining. If the discriminative network can recognize that the image is generated rather than a real image, the discriminative model continuously performs iterations until the discriminative network mistakenly considers the image restored by the second decoder as the real image. In this case, a final image sequence model and a final codebook are obtained. The training process of the first stage B2 is a process of performing adversarial training in which the discriminative model is started.

In this embodiment, the image sequence model is obtained through model training of the two stages. Offline indicators such as a peak signal to noise ratio (PSNR), a structural similarity (SSIM), a frechet inception distance score (FID), and an inception score (IS) of the observation sample image generated by the generative model are prior to that of the VQVAE, which lays a better foundation for a subsequent process of performing image reconstruction based on the codebook. The PSNR is obtained through a calculation based on an error between pixels corresponding to the observation sample image and the original sample image, and a higher PSNR value indicates better quality of the observation sample image. The SSIM measures a similarity between the observation sample image and the original sample image from three aspects of brightness, contrast, and structure. The FID measures a similarity between the images according to computer visual features of the observation sample image and the original sample image and mainly calculates a distance between feature vectors of the original sample image and the observation sample image. The IS mainly measures diversity and definition of the observation sample image.

Regardless of the training manners described above, the obtained codebook is shown in FIG. 2b, and the codebook includes an index number and a code. During model training, the codebook is continuously updated, to finally obtain a codebook with universality and versatility. For example, in FIG. 2b, a "dog's eye" in an image is an image feature C1, a code corresponding to the image feature C1 is "D1," and an index number corresponding to the code "D1" is "1." A "dog's nose" in the image is an image feature C2, a code corresponding to the image feature C2 is "D2," and an index number corresponding to the code "D2" is "N−1," and N is a positive integer.

In the foregoing or following embodiments of this application, before matching is performed on the plurality of initial product images, a second image-text matching model is pre-trained. A process of training the second image-text matching model includes: forming the product image and the style description text into an image-text matching pair as a training sample with a constraint of the same semantic space, and respectively performing feature encoding on the image-text matching pair by using the same semantic space, to obtain an image feature and a text feature. In the same semantic space, a matching degree between the image feature and the text feature may be calculated, and the image-text matching model is obtained in a large batch size training manner and a contrastive learning training manner. Based on this, the inputting, by the image generation component 101, the plurality of initial product images and the style description text into a second image-text matching model for matching, to obtain at least one candidate product image of which a matching degree meets a threshold requirement includes: inputting the plurality of initial product images and the style description text into the image-text matching model, respectively performing feature encoding on the plurality of initial product images and the style description text and mapping the plurality of initial product images and the style description text to the same semantic space, to obtain a plurality of second image features and a text feature; and in the same semantic space, matching degrees between the second image features and the text feature may be calculated, and at least one initial product image of which a matching degree is greater than a threshold may be selected from the plurality of initial product images according to matching degrees between the plurality of second image features and the text feature as the candidate product image.

As shown in FIG. 2a, an implementation structure of the image-text matching model includes: an image encoder module, a text encoder module, and a matching module. An image-text matching process of the implementation structure includes: inputting the initial product images into the image encoder module for performing image encoding on the initial product images, to obtain a second image feature, inputting the style description text into the text encoder module for performing text encoding on the style description text, to obtain the text feature, where the second image features and the text feature are located in the same semantic space, then inputting the second image features and the text feature into the matching module, to obtain matching degrees between the second image features and the text feature, and selecting at least one initial product image of which a matching degree is greater than a threshold from the plurality of initial product images as the candidate product image.

Figure 3A:
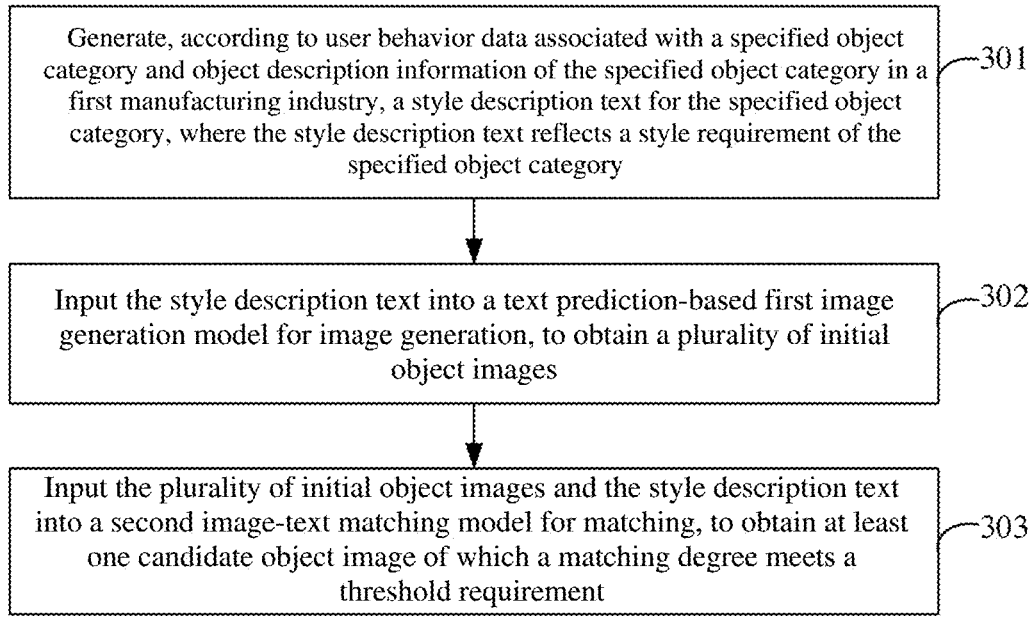
FIG. 3a is a schematic flowchart of an image generation method, according to an exemplary embodiment of this application.

In this embodiment of this application, in addition to providing the image generation system, an image generation method is further provided, which may generate product images required in a production and manufacturing process for various manufacturing industries. As shown in FIG. 3a, the method includes the following steps.

301. Generate, according to user behavior data associated with a specified product category and product description information of the specified product category in a manufacturing industry, a style description text for the specified product category, where the style description text reflects a style requirement of the specified product category.

302. Input the style description text into a text prediction-based first image generation model for image generation, to obtain a plurality of initial product images.

303. Input the plurality of initial product images and the style description text into a second image-text matching model for matching, to obtain at least one candidate product image of which a matching degree meets a threshold requirement.

Figure 3B:
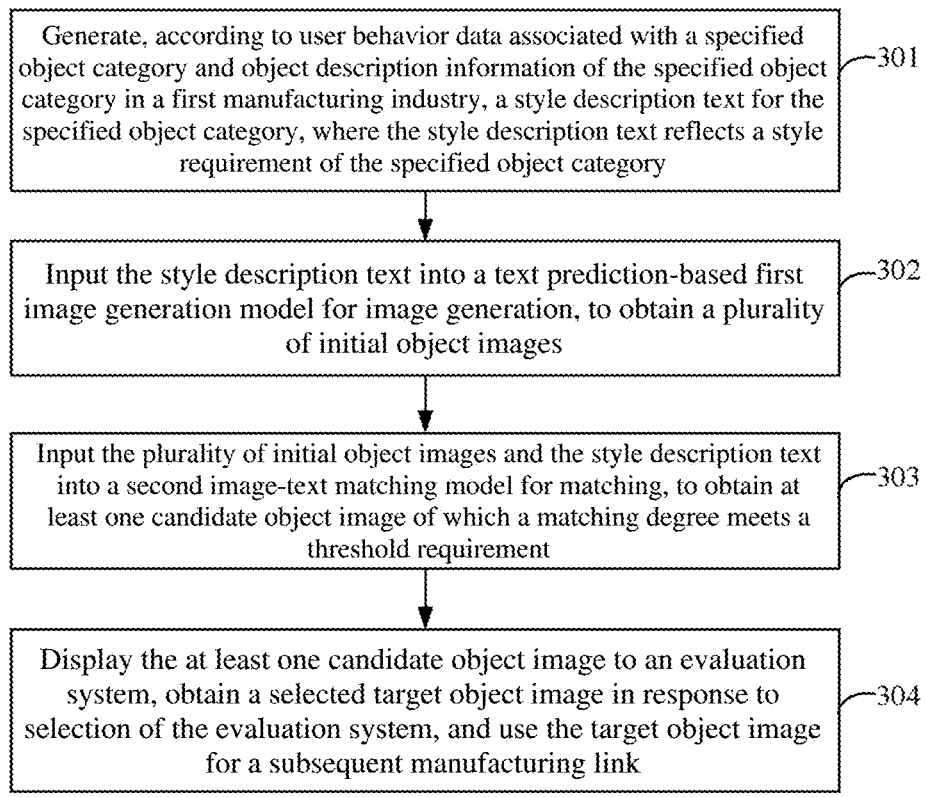
FIG. 3b is a schematic flowchart of another image generation method, according to an exemplary embodiment of this application.

Further, as shown in FIG. 3b, in another image generation method provided in this embodiment of this application, after step 303, the method further includes the following steps.

304. Display the at least one candidate product image to an evaluation system, obtain a selected target product image in response to selection of the evaluation system, and use the target product image for a subsequent manufacturing link.

In some embodiments, the inputting the style description text into a text prediction-based first image generation model for image generation, to obtain a plurality of initial product images includes: inputting a text sequence corresponding to the style description text into the first image generation model, and generating a plurality of image sequences according to the text sequence based on a pre-trained codebook, where the codebook represents a quantization text representation of the image sequences; and respectively performing image reconstruction on the plurality of image sequences, to obtain the plurality of initial product images.

In some embodiments, the generating a plurality of image sequences according to the text sequence based on a pre-trained codebook includes: inputting the text sequence into an encoder of the first image generation model, and encoding the text sequence, to obtain a first image feature; and inputting the first image feature into a decoder of the first image generation model, and respectively decoding the first image feature based on the codebook, to obtain the plurality of image sequences.

In some embodiments, the respectively decoding the first image feature based on the codebook, to obtain the plurality of image sequences includes: decoding the first image feature based on the codebook and by using a sparse attention mechanism in the decoder of the first image generation model, to obtain the plurality of image sequences.

In some embodiments, a length of each of the image sequences is greater than or equal to 4096. Correspondingly, image reconstruction may be performed on an image sequence with a length greater than or equal to 4096, to obtain a high-definition initial product image with a resolution of 800*800 or even 1024*1024.

In some embodiments, the respectively performing image reconstruction on the plurality of image sequences, to obtain the plurality of initial product images includes: inputting the plurality of image sequences into an image sequence model, and respectively performing, by a decoder of the image sequence model, image reconstruction on the plurality of image sequences, to obtain the plurality of initial product images, where the image sequence model adopts an encoder-decoder structure, and the image sequence model is a neural network model obtained by training the codebook.

Optionally, the method provided in this embodiment of this application further includes: acquiring a plurality of cross-field original sample images; and performing model training by using a vector quantization generative adversarial network and using the plurality of original sample images, to obtain the image sequence model and the codebook.

In some embodiments, the plurality of original sample images include a first sample group and a second sample group, and the performing model training by using a vector quantization generative adversarial network and using the plurality of original sample images, to obtain the image sequence model and the codebook includes: performing non-adversarial training by using the original sample images in the first sample group, to obtain an image sequence model in an intermediate state; and performing adversarial training on the image sequence model in the intermediate state by using the vector quantization generative adversarial network and using the original sample images in the second sample group, to obtain the image sequence model and the codebook.

In some embodiments, the inputting the plurality of initial product images and the style description text into a second image-text matching model for matching, to obtain at least one candidate product image of which a matching degree meets a threshold requirement includes: inputting the plurality of initial product images and the style description text into the second image-text matching model, respectively performing feature encoding on the plurality of initial product images and the style description text and mapping the plurality of initial product images and the style description text to the same semantic space, to obtain a plurality of second image features and a text feature; and selecting, according to matching degrees between the plurality of second image features and the text feature, at least one initial product image of which a matching degree is greater than a threshold from the plurality of initial product images as the candidate product image.

In some embodiments, the generating, according to user behavior data associated with a specified product category and product description information of the specified product category in a manufacturing industry, a style description text for the specified product category includes: performing text mining on the user behavior data associated with the specified product category, to obtain a product property and a category description in which a user is interested; performing text mining on description information of a new product that appears within a latest time period in the specified product category, to obtain a product property and a category description of the new product; obtaining category property data from a category-property-value knowledge system of the manufacturing industry according to the product property and the category description in which the user is interested and the product property and the category description of the new product, where the category property data includes at least a commodity style property; and generating the style description text according to the category property data.

In some embodiments, the manufacturing industry is a clothing industry, a printing industry, articles-for-daily-use industry, a furniture industry, an appliance industry, or a passenger car industry.

According to the image generation method provided in this embodiment of this application, in a manufacturing industry scenario, a style requirement of a specified product category is automatically captured according to user behavior data associated with the specified product category and product description information of the specified product category, to generate a style description text, and the style description text is converted to product images by using a text prediction-based first image generation model. The product images are further screened by using a second image-text matching model, to obtain a product image with high quality. In the entire process, a procedure from style description text mining to text-to-image prediction to image quality evaluation is built, to provide an automation product image generation capability for the manufacturing industry, shorten a cycle of designing and producing the product image in the manufacturing industry, and improve production efficiency of the product image.

It should be noted that, various steps of the method provided in the embodiments of this application may be executed by the same device, or may be executed by different devices. For example, step 301 to step 303 may be executed by a device A. In another example, step 301 and step 302 may be executed by the device A, and step 303 may be executed by a device B.

In addition, some procedures described in the foregoing embodiments and the accompanying drawings include multiple operations performed in a particular order. However, it should be clearly learned that these operations may not be performed in the order in which these operations are performed in the specification or may be performed concurrently. Sequence numbers, such as 301 and 302, of the operations are merely used to distinguish different operations, and the sequence numbers do not represent any execution order. In addition, these procedures may include more or fewer operations, and these operations may be performed in an order or may be performed concurrently. It should be noted that, descriptions of "first," "second," and the like in the specification are used to distinguish different messages, devices, modules, and the like, and do not indicate a sequence and do not limit that "first" and "second" are different types either.

Figure 4:
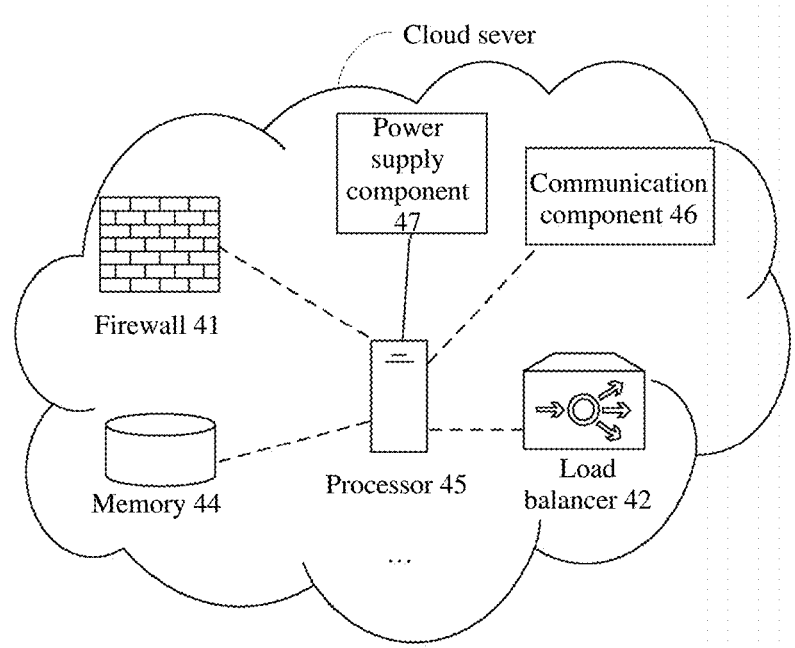
FIG. 4 is a schematic structural diagram of a cloud server, according to an exemplary embodiment of this application.

FIG. 4 is a schematic structural diagram of a cloud server, according to an exemplary embodiment of this application. The cloud server is configured to run a text prediction-based first image generation model and a second image-text matching model and configured to generate a corresponding product image according to a style description text. As shown in FIG. 4, the cloud server includes: a memory 44 and a processor 45.

The memory 44 is configured to store a computer program, and may be further configured to store other data to support operations on the cloud server. The memory 44 may be a product storage service (OSS).

The memory 44 can be implemented by any type of volatile or non-volatile storage devices or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk, or an optical disc.

The processor 45 is coupled to the memory 44 and is configured to perform the computer program in the memory 44 to be configured to: obtain a style description text, where the style description text reflects a style requirement of a specified product category in a manufacturing industry; input the style description text into a text prediction-based first image generation model for image generation, to obtain a plurality of initial product images; and input the plurality of initial product images and the style description text into a second image-text matching model for matching, to obtain at least one candidate product image of which a matching degree meets a threshold requirement.

In some embodiments, the manufacturing industry is a clothing industry, a printing industry, articles-for-daily-use industry, a furniture industry, an appliance industry, or a passenger car industry.

In some embodiments, the processor 45 may further send the at least one candidate product image to a quality evaluation component for the quality evaluation component to display the at least one candidate product image to an evaluation system, obtain a selected target product image in response to selection of the evaluation system, and use the target product image for a subsequent manufacturing link.

In some embodiments, when inputting the style description text into the text prediction-based first image generation model for image generation, to obtain the plurality of initial product images, the processor 45 is configured to: input a text sequence corresponding to the style description text into the first image generation model, and generate a plurality of image sequences according to the text sequence based on a pre-trained codebook, where the codebook represents a quantization text representation of the image sequences; and respectively perform image reconstruction on the plurality of image sequences, to obtain the plurality of initial product images.

In some embodiments, when generating the plurality of image sequences according to the text sequence based on the pre-trained codebook, the processor 45 is configured to: input the text sequence into an encoder of the first image generation model, and encode the text sequence, to obtain a first image feature; and input the first image feature into a decoder of the first image generation model, and respectively decode the first image feature based on the codebook, to obtain the plurality of image sequences.

In some embodiments, when respectively decoding the first image feature based on the codebook, to obtain the plurality of image sequences, the processor 45 is configured to: decode the first image feature based on the codebook and by using a sparse attention mechanism in the decoder of the first image generation model, to obtain the plurality of image sequences.

In some embodiments, a length of each of the image sequences is greater than or equal to 4096. Correspondingly, image reconstruction may be performed on an image sequence with a length greater than or equal to 4096, to obtain a high-definition initial product image with a resolution of 800*800 or even 1024*1024.

In some embodiments, when respectively performing image reconstruction on the plurality of image sequences, to obtain the plurality of initial product images, the processor 45 is configured to: input the plurality of image sequences into an image sequence model, and respectively performing, by a decoder of the image sequence model, image reconstruction on the plurality of image sequences, to obtain the plurality of initial product images, where the image sequence model adopts an encoder-decoder structure, and the image sequence model is a neural network model obtained by training the codebook.

In some embodiments, the processor 45 is further configured to: acquire a plurality of cross-field original sample images; and perform model training by using a vector quantization generative adversarial network and using the plurality of original sample images, to obtain the image sequence model and the codebook.

In some embodiments, the plurality of original sample images include a first sample group and a second sample group, and when performing model training by using the vector quantization generative adversarial network and using the plurality of original sample images, to obtain the image sequence model and the codebook, the processor 45 is configured to: perform non-adversarial training by using the original sample images in the first sample group, to obtain an image sequence model in an intermediate state; and perform adversarial training on the image sequence model in the intermediate state by using the vector quantization generative adversarial network and using the original sample images in the second sample group, to obtain the image sequence model and the codebook.

In some embodiments, when inputting the plurality of initial product images and the style description text into the second image-text matching model for matching, to obtain the at least one candidate product image of which the matching degree meets the threshold requirement, the processor 45 is configured to: input the plurality of initial product images and the style description text into the second image-text matching model, respectively perform feature encoding on the plurality of initial product images and the style description text and map the plurality of initial product images and the style description text to the same semantic space, to obtain a plurality of second image features and a text feature; and select, according to matching degrees between the plurality of second image features and the text feature, at least one initial product image of which a matching degree is greater than a threshold from the plurality of initial product images as the candidate product image.

Further, as shown in FIG. 4, the cloud server further includes: other components such as a firewall 41, a load balancer 42, a communication component 46, and a power supply component 48. Only some components are schematically shown in FIG. 4, which does not mean that the cloud server includes only the components shown in FIG. 4.

According to the server provided in this embodiment of this application, in a manufacturing industry scenario, a style requirement of a specified product category is automatically captured according to user behavior data associated with the specified product category and product description information of the specified product category, to generate a style description text, and the style description text is converted to product images by using a text prediction-based first image generation model. The product images are further screened by using a second image-text matching model, to obtain a product image with high quality. In the entire process, a procedure from style description text mining to text-to-image prediction to image quality evaluation is built, to provide an automation product image generation capability for the manufacturing industry, shorten a cycle of designing and producing the product image in the manufacturing industry, and improve production efficiency of the product image.

Correspondingly, an embodiment of this application further provides a computer-readable storage medium storing computer programs, where the computer programs/instructions, when being executed by a processor, cause the processor to implement the steps of the method shown in FIG. 3a or FIG. 3b.

Correspondingly, an embodiment of this application further provides a computer program product, including computer programs/instructions, where the computer programs/instructions, when being executed by a processor, cause the processor to implement the steps of the method shown in FIG. 3a or FIG. 3b.

The communication component in FIG. 4 is configured to facilitate communication between a device in which the communication component is located and other devices in a wired or wireless manner. The device in which the communication component is located may access a communication standard-based wireless network, such as WiFi, 2G, 3G, 4G/LTE, 5G, and other mobile communication networks, or a combination thereof. In an exemplary embodiment, the communication component receives a broadcast signal or broadcast related information from an external broadcast management system through a broadcast channel. In an exemplary embodiment, the communication component further includes a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

The power supply component in FIG. 4 provides power for components of a device in which the power supply component is located. The power supply component may include a power supply management system, one or more power supplies, and other components related to generation, management, and allocation of power for the device in which the power supply component is located.

A person skilled in the art should understand that the embodiments of the present invention may be provided as a method, a system, or a computer program product. Therefore, this application may be in a form of complete hardware embodiments, complete software embodiments, or combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In typical configuration, a computing device includes one or more processors (CPU), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer includes, but is not limited to, a phase-change memory (PRAM), a static random access memory (SRAM), a dynamic random access memory (DRAM), or other types of random access memory (RAM), a read-only memory (ROM), an erasable programmable read-only memory (EEPROM), a flash memory or another storage technology, a compact disc read-only memory (CD-ROM), a digital versatile disc (DVD) or another optical storage, a cartridge tape, a magnetic tape, a magnetic disk storage or another magnetic storage device, or any other non-transmission medium, which may be configured to store information accessible by a computing device. According to limitations of this specification, the computer-readable medium does not include transitory computer-readable media, such as a modulated data signal and a modulated carrier.

It should be further noted that the terms "include," "comprise," or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

The foregoing descriptions are merely embodiments of this application, and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. An image generation method, comprising:
generating, according to user behavior data associated with a specified object category and object description information of the specified object category in a manufacturing industry, a style description text for the specified object category, wherein the style description text reflects a style requirement of the specified object category;
inputting the style description text into a text prediction-based first image generation model for image generation, to obtain a plurality of initial object images, wherein the first image generation model comprises an encoder-decoder structure implemented based on a vector quantization generative adversarial network (VQGAN) and a sparse attention mechanism, wherein the inputting the style description text into the text prediction-based first image generation model to obtain the plurality of initial object images comprises:
inputting a text sequence corresponding to the style description text into the first image generation model, and generating a plurality of image sequences according to the text sequence based on a codebook, wherein the codebook represents a quantization text representation of the image sequences; and
respectively performing image reconstruction on the plurality of image sequences, to obtain the plurality of initial object images; and
inputting the plurality of initial object images and the style description text into a second image-text matching model for matching, to obtain at least one candidate object image of which a matching degree meets a threshold requirement.

2. The method according to claim 1, wherein the generating a plurality of image sequences according to the text sequence based on a codebook comprises:
inputting the text sequence into an encoder of the first image generation model, and encoding the text sequence, to obtain a first image feature; and
inputting the first image feature into a decoder of the first image generation model, and respectively decoding the first image feature based on the codebook, to obtain the plurality of image sequences.

3. The method according to claim 2, wherein the respectively decoding the first image feature based on the codebook, to obtain the plurality of image sequences comprises:
decoding the first image feature based on the codebook and by using a sparse attention mechanism in the decoder of the first image generation model, to obtain the plurality of image sequences.

4. The method according to claim 3, wherein a length of each of the image sequences is greater than or equal to 4096.

5. The method according to claim 2, wherein the respectively performing image reconstruction on the plurality of image sequences, to obtain the plurality of initial object images comprises:
inputting the plurality of image sequences into an image sequence model, and respectively performing, by a decoder of the image sequence model, image reconstruction on the plurality of image sequences, to obtain the plurality of initial object images, wherein
the image sequence model adopts an encoder-decoder structure, and the image sequence model is a neural network model obtained by training the codebook.

6. The method according to claim 5, further comprising:
acquiring a plurality of cross-field original sample images; and
performing model training by using a vector quantization generative adversarial network and using the plurality of original sample images, to obtain the image sequence model and the codebook.

7. The method according to claim 6, wherein the plurality of original sample images comprise a first sample group and a second sample group, and the performing model training by using a vector quantization generative adversarial network and using the plurality of original sample images, to obtain the image sequence model and the codebook comprises:
performing non-adversarial training on an initial model by using the original sample images in the first sample group, to obtain an image sequence model in an intermediate state; and
performing adversarial training on the image sequence model in the intermediate state by using the vector quantization generative adversarial network and using the original sample images in the second sample group, to obtain the image sequence model and the codebook.

8. The method according to claim 1, wherein the inputting the plurality of initial object images and the style description text into a second image-text matching model for matching, to obtain at least one candidate object image of which a matching degree meets a threshold requirement comprises:
inputting the plurality of initial object images and the style description text into the second image-text matching model, wherein the second image-text matching model is configured to respectively perform feature encoding on the plurality of initial object images and the style description text and map the plurality of initial object images and the style description text to a same semantic space, to obtain a plurality of second image features and a text feature; and
selecting, according to matching degrees between the plurality of second image features and the text feature, at least one initial object image of which a matching degree is greater than a threshold from the plurality of initial object images as the candidate object image.

9. The method according to claim 1, wherein the generating, according to user behavior data associated with a specified object category and object description information of the specified object category in a first manufacturing industry, a style description text for the specified object category comprises:

performing text mining on the user behavior data associated with the specified object category, to obtain an object property and a category description in which a user is interested;

performing text mining on description information of a new object that appears within a latest time period in the specified object category, to obtain an object property and a category description of the new object;

obtaining category property data from a category-property-value knowledge system of the first manufacturing industry according to the object property and the category description in which the user is interested and the object property and the category description of the new object, wherein the category property data comprises at least a commodity style property; and generating the style description text according to the category property data.

10. The method according to claim 1, further comprising:

displaying the at least one candidate object image to an evaluation system, obtaining a selected target object image in response to selection of the evaluation system, and using the target object image for a subsequent manufacturing link.

11. A system for image generation, comprising one or more processors and one or more non-transitory computer-readable memories coupled to the one or more processors and configured with instructions executable by the one or more processors to cause the system to perform operations comprising:

generating, according to user behavior data associated with a specified object category and object description information of the specified object category in a manufacturing industry, a style description text for the specified object category, wherein the style description text reflects a style requirement of the specified object category;

inputting the style description text into a text prediction-based first image generation model for image generation, to obtain a plurality of initial object images, wherein the first image generation model comprises an encoder-decoder structure implemented based on a vector quantization generative adversarial network (VQGAN) and a sparse attention mechanism; and inputting the plurality of initial object images and the style description text into a second image-text matching model for matching, to obtain at least one candidate object image of which a matching degree meets a threshold requirement, wherein the inputting the plurality of initial object images and the style description text into the second image-text matching model to obtain at least one candidate object image comprises:

inputting the plurality of initial object images and the style description text into the second image-text matching model, wherein the second image-text matching model is configured to respectively perform feature encoding on the plurality of initial object images and the style description text and map the plurality of initial object images and the style description text to a same semantic space, to obtain a plurality of second image features and a text feature; and selecting, according to matching degrees between the plurality of second image features and the text feature, at least one initial object image of which a matching degree is greater than a threshold from the plurality of initial object images as the candidate object image.

12. The system of claim 11, wherein the inputting the style description text into the text prediction-based first image generation model to obtain the plurality of initial object images comprises:

inputting a text sequence corresponding to the style description text into the first image generation model, and generating a plurality of image sequences according to the text sequence based on a codebook, wherein the codebook represents a quantization text representation of the image sequences; and respectively performing image reconstruction on the plurality of image sequences, to obtain the plurality of initial object images.

13. The system of claim 12, wherein the generating a plurality of image sequences according to the text sequence based on a codebook comprises:

inputting the text sequence into an encoder of the first image generation model, and encoding the text sequence, to obtain a first image feature; and inputting the first image feature into a decoder of the first image generation model, and respectively decoding the first image feature based on the codebook, to obtain the plurality of image sequences.

14. The system of claim 13, wherein the respectively decoding the first image feature based on the codebook, to obtain the plurality of image sequences comprises:

decoding the first image feature based on the codebook and by using a sparse attention mechanism in the decoder of the first image generation model, to obtain the plurality of image sequences.

15. The system of claim 13, wherein the respectively performing image reconstruction on the plurality of image sequences, to obtain the plurality of initial object images comprises:

inputting the plurality of image sequences into an image sequence model, and respectively performing, by a decoder of the image sequence model, image reconstruction on the plurality of image sequences, to obtain the plurality of initial object images, wherein the image sequence model adopts an encoder-decoder structure, and the image sequence model is a neural network model obtained by training the codebook.

16. The system of claim 15, wherein the operations further comprise:

acquiring a plurality of cross-field original sample images; and performing model training by using a vector quantization generative adversarial network and using the plurality of original sample images, to obtain the image sequence model and the codebook.

17. The system of claim 16, wherein the plurality of original sample images comprise a first sample group and a second sample group, and the performing model training by using a vector quantization generative adversarial network and using the plurality of original sample images, to obtain the image sequence model and the codebook comprises:

performing non-adversarial training on an initial model by using the original sample images in the first sample group, to obtain an image sequence model in an intermediate state; and performing adversarial training on the image sequence model in the intermediate state by using the vector quantization generative adversarial network and using the original sample images in the second sample group, to obtain the image sequence model and the codebook.

18. The system of claim 11, wherein the operations further comprise:

displaying the at least one candidate object image to an evaluation system, obtaining a selected target object image in response to selection of the evaluation system, and using the target object image for a subsequent manufacturing link.

19. A computer-implemented method, comprising:

generating, according to user behavior data associated with a specified object category and object description information of the specified object category in a manufacturing industry, a style description text for the specified object category, wherein the style description text reflects a style requirement of the specified object category;

inputting the style description text into a text prediction-based first image generation model for image generation, to obtain a plurality of initial object images, wherein the first image generation model comprises an encoder-decoder structure implemented based on a vector quantization generative adversarial network (VQGAN) and a sparse attention mechanism;

inputting the plurality of initial object images and the style description text into a second image-text matching model for matching, to obtain at least one candidate object image of which a matching degree meets a threshold requirement; and displaying the at least one candidate object image to an evaluation system, obtaining a selected target object image in response to selection of the evaluation system, and using the target object image for a subsequent manufacturing link.

20. The computer-implemented method of claim 19, wherein the manufacturing industry is a clothing industry, a printing industry, an articles-for-daily-use industry, a furniture industry, an appliance industry, or a passenger car industry.

* * * * *